United States Patent [19]

Häivälä

[11] Patent Number: 5,022,974
[45] Date of Patent: Jun. 11, 1991

[54] METHOD AND APPARATUS FOR ELECTROLYTIC TREATMENT OF LIQUIDS, ESPECIALLY WASTE WATER

[76] Inventor: Erkki Häivälä, Pellervontie 4, SF-05830 Hyvinkää, Finland

[21] Appl. No.: 314,662

[22] PCT Filed: Aug. 4, 1987

[86] PCT No.: PCT/FI87/00101
§ 371 Date: Feb. 3, 1989
§ 102(e) Date: Feb. 3, 1989

[87] PCT Pub. No.: WO88/00926
PCT Pub. Date: Feb. 11, 1988

[30] Foreign Application Priority Data

Aug. 4, 1986 [FI] Finland ............................ 863166

[51] Int. Cl.⁵ ................................................ C02F 1/46
[52] U.S. Cl. .................................... 204/275; 204/284; 204/149
[58] Field of Search ................. 204/149, 275, 284

[56] References Cited

U.S. PATENT DOCUMENTS

| | | | |
|---|---|---|---|
| 2,399,289 | 4/1946 | Negus | 204/275 |
| 4,029,557 | 6/1977 | Christensen et al. | 204/149 |
| 4,224,129 | 9/1980 | McIntyre et al. | 204/263 |
| 4,519,889 | 5/1985 | Pellegri et al. | 204/275 |

Primary Examiner—John F. Niebling
Assistant Examiner—Arun S. Phasge
Attorney, Agent, or Firm—Pollock, Vande Sande & Priddy

[57] ABSTRACT

An apparatus for the electrolytic treatment of liquids, a liquid containing reactants, such as waste water containing solids or liquid to be separated from water and/or containing substances to be decomposed or to be made innocuous, is passed between two platelike electrodes of opposite charge having their operative surfaces opposed to each other, and forming a reaction area therebetween. A medium is introduced into the reaction area separately from the liquid to be treated in a flow having a direction substantially different from that of the operative surfaces of the electrodes via holes perforated in the electrode plates.

1 Claim, 3 Drawing Sheets

METHOD AND APPARATUS FOR ELECTROLYTIC TREATMENT OF LIQUIDS, ESPECIALLY WASTE WATER

This invention relates to method for electrolytic treatment of liquids, in which method liquid containing reactants, such as waste water containing solids or liquid to be separated from water and/or containing substances to be decomposed or to be made innocuous, is passed between two platelike electrodes of opposite charge having their operative surfaces opposed to each other and forming a reaction area therebetween. The invention relates also to an apparatus for carrying out such a method.

BACKGROUND OF THE INVENTION

It is widely known to use electrolysis for treatment of different kinds of waste waters, which contain solid or liquid impurities in suspension, emulsion or in soluble form, which impurities are to be separated from the water as a separate phase by means of chemicals produced by electrolysis and/or flotation by electrolytically produced gas bubbles. Various wastes, such as various suspensions from pulp and paper manufacturing industry, oil emulsions and municipal waste waters can be subject to such a treatment, and these processes are widely described in the patent literature, e.g. in U.S. Pat. No. 3,505,188 and in CH-patent 425 655.

The waste water often contains also harmful dissolved substances, which are to be made innocuous by decomposing such substances. This can be done in electrolysis by producing oxygen and/or chlorine, which oxidize organic material present in the water. One of such substances is cyanide, which is present in waste waters resulting from various industrial processes, such as metal plating and refining of gold and silver ores. The technique used conventionally in destroying cyanide includes the adding of NaCl to waste water containing cyanide and passing it thereafter through an electrolytic cell, wherein the chlorine and caustic are generated from the salt and react with the metal-cyanide compound producing harmless precipitates and $CO_2$ and $N_2$. Another alternative is to pass a pure electrolyte containing NaCl through an electrolytic cell and to lead it thereafter to a reservoir containing the cyanide waste, wherein the decomposition reaction takes place. These methods are described e.g. in U.S. Pat. No. 4,029,557, GB-patent 1 433 858 and DE-patent application 2 331 189.

One problem in the electrolytic purification processes is that the surfaces of the electrode plates are not utilized optimally. In a flow between the electrodes, a diffusion layer is generated in the proximity of each electrode, which makes the diffusion of reactants onto the operative surface and diffusion of the products therefrom difficult. Moreover, gases generated by the electrolysis reduce the operative surface of the electrodes and they must thus be quickly removed from the surface. Due to the nature of the waste waters, fouling of the operative surfaces by the depositing impurities of the waste water is also a considerable problem.

There have been attempts to overcome these disadvantages by agitating the liquid before it is introduced into the passage between the plates. The conditions between the electrode plates are, however, not controlled sufficiently by this procedure, in particular as the passages between the plates are long and narrow, which is advantageous for the constructional simplicity and the efficiency of the electric current.

SUMMARY OF THE INVENTION

The object of the present invention is to overcome the disadvantages referred to hereinabove and provide a method and an apparatus, by means of which the conditions between the electrodes are controlled in such a manner, that the operative area of the electrode surfaces can be effectively used. The invention helps to remove diffusion layers, gaseous layers and deposited layers on the surfaces of the electrodes, which all tend to reduce the overall efficiency of the process.

A further object of the invention is to create a practical arrangement for introducing reactants into the reaction area between the electrodes, which arrangement can be used e.g. in electrolytic decomposition of cyanide.

For achieving these purposes there is, according to the invention, provided a method, wherein a medium is introduced into the reaction area separately from the liquid to be treated in a flow having a direction substantially different from that of the operative surfaces of the electrodes. By this arrangement the flow of the medium creates a turbulence, which contributes to a better mixing of the components within the reaction area, thus enhancing the rate of various reactions between the components, and at the same time removing any layers, which might decrease the rate of the electrolytic reactions on the surfaces.

According to an advantageous embodiment, the medium is introduced from behind at least one of the electrodes via holes perforated in the electrode plate. When using this method, the invention can be put into practice in a very simple manner.

According to a further advantageous embodiment of the invention, the medium is an electrolyte containing dissolved components participating in the reactions in the reaction area. When this method is applied, the invention can be used at the same time in dosing specific reactants into the reaction area. In case the medium is a solution containing electrolytes, the electric conductivity of the liquid can be increased, if not high enough. According to the same principle, sodium chloride can be dosed into the reaction area for electrolytic oxidation of cyanide.

The method of the invention is carried out by means of an apparatus, which comprises means for introducing a medium into the reaction area separately from the liquid to be treated in a flow having a direction substantially different from that of the operative surfaces of the electrodes.

According to an advantageous embodiment, at least one of the electrode plates in the apparatus comprises holes perforated therein for introducing the medium from behind of the electrode plate into the reaction area. An apparatus of this kind can have an extraordinarily simple construction. For example, an intermediate tank for the medium can be provided in the apparatus behind the perforated electrode plate.

BRIEF DESCRIPTION OF THE DRAWINGS

The invention will now be described in more detail with reference to accompanying drawings, wherein.

DETAILED DESCRIPTION OF THE INVENTION

Figure 1:
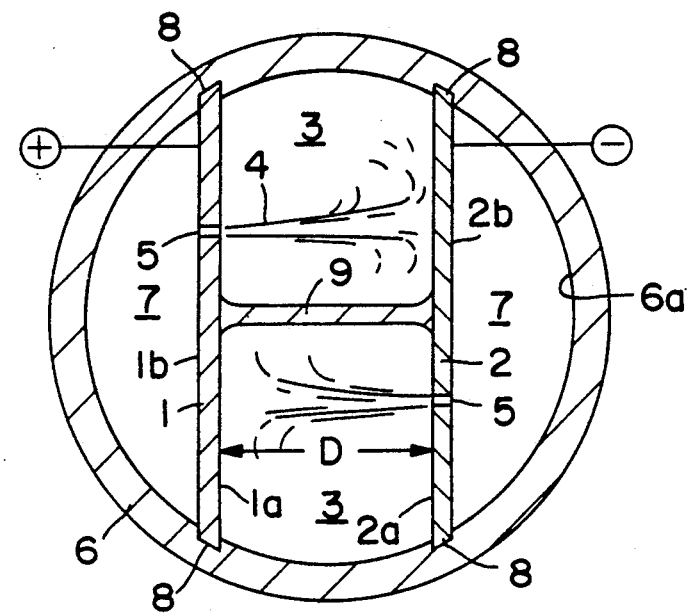
FIG. 1 shows the apparatus of the invention in cross-section.
Figure 2:
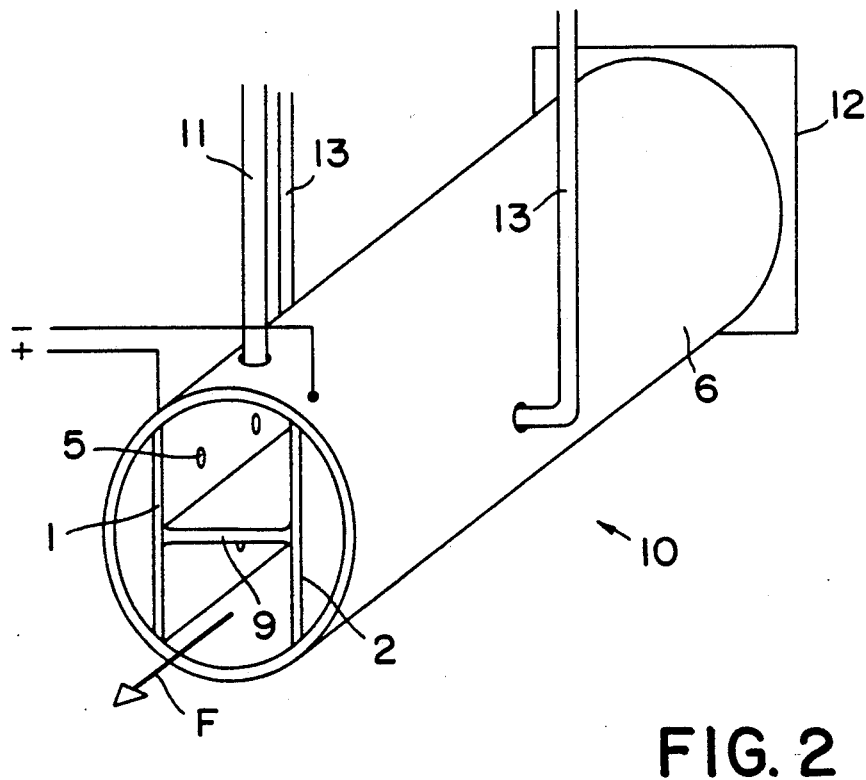
FIG. 2 shows the apparatus of FIG. 1 in perspective.

As shown by FIGS. 1 and 2, the apparatus 10 comprises a horizontal tubular body 6, wherein are disposed two elongate electrode plates 1 and 2 extending in the axial direction of the body and serving as an anode and a cathode, respectively. The electrode plates are at a constant distance D from each other and their vertical operative surfaces 1a and define therebetween a reaction area 3, wherein the electrolytic reactions and subsequent reactions resulting from the electrolytic products take place.

The tubular body 6 is made of electrically non-conductive material, such as plastic and the electrode plates are interposed between slots 8 extending axially on the inner wall 6a of the body 6, receiving the edges of the electrode plates. It is self-evident, that the electrode plates can be secured to the body in any other suitable manner. The body 6 can be also electrically conducting, in which case non-conductive material must be disposed between the plates and the body.

The reaction area 3 is divided in two compartments by a transverse plate 9 of non-conductive material, which extends between the plates 1 and 2 perpendicularly to the operative surfaces 1a and 2a. The plate 9 can be secured to plates 1 and 2, for example, with bolts inserted from behind the electrodes. The waste water is introduced to the apparatus through an inlet conduit 11 and it passes horizontally in the axial direction of the tube 6 along the upper reaction area 3 bounded by electrode plates 1 and 2 the transverse plate 9 and the inner surface 6a of the tube 6, until it reaches the end of the tube 6, which is closed by an rear end plate 12. The transverse plate 9 extends in the axial direction near the end plate 12 and leaves a passage for the waste water to flow down to the lower reaction area 3 through the passage between the plate 12 and the rear edge of the transverse plate 9. In this lower reaction area the waste water flows back towards the front end of the tube and it is withdrawn through an outlet conduit disposed in the front end plate, which is attached to the front end of the tube 6. The outlet flow takes place in a direction indicated by the arrow F. For the sake of illustrating the inside of the apparatus, the front end plate is not shown in FIG. 2.

In accordance with invention, the electrode plates 1 and 2 comprise holes 5, which are formed by perforating the plate material. On the back side of each electrode plate 1, 2 opposite to the operative surface thereof, there is a space 7, which is limited by the back surface 1b or 2b of the electrode and the inner wall 6a of the tube. The holes 5 create a passage from this space 7 to the reaction area 3. In the embodiment shown by FIGS. 1 and 2, the holes are aligned axially in two lines in each electrode plate so, that the upper line of holes create a passage to the upper reaction area 3 and the lower line create a passage to the lower reaction area 3.

During the operation of the apparatus, a medium is introduced to spaces 7 through inlet conduits 13, which are led through the tube wall on both sides of the tube 6. The spaces 7 serve as an intermediate containers or tanks for the medium and the medium flows through the holes 5 into the reaction area 3 containing the waste water, thus creating turbulence and causing mixing of the waste water flowing in axial direction of the tube. The diameter of the holes 5 is small enough compared to the thickness of the electrode plate so that at a suitable pressure of the medium it flows as a jet 4 into the area 3 causing effective mixing and at the same time it flushes the opposite electrode surface. The ratio of the hole diameter to the plate thickness should be less than 1.0 in order to generate a jet-like flow of the medium.

Figure 3:
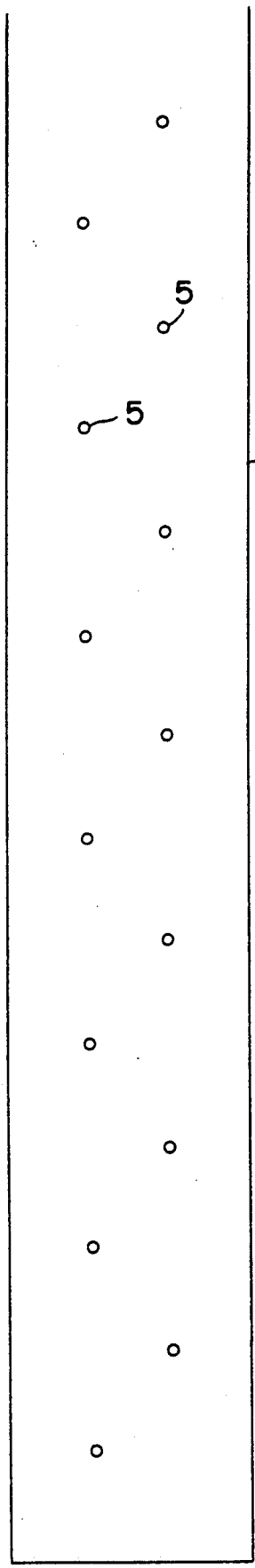
FIG. 3 is a plan view of one of the electrode plates of the invention.

FIG. 3 shows the electrode plate 1, which is disposed in the body 6 of FIG. 2. The opposing plate 2 has a similar construction. The plate is a planar, elongated and rectangular plate with a width of 12,5 cm, a length of 1 m and a thickness of 5 mm. The plate comprises circular holes 5 perforated therein in two parallel lines so that each line comprises seven holes distributed uniformly at equal distances of 13 cm. The distance of each line from the adjacent upper or lower edge, respectively, is 4 cm. The diameter of the holes is 2 mm. In the apparatus of FIGS. 1 and 2 the plates are disposed at the distance of 6 cm from each other.

Figure 4:
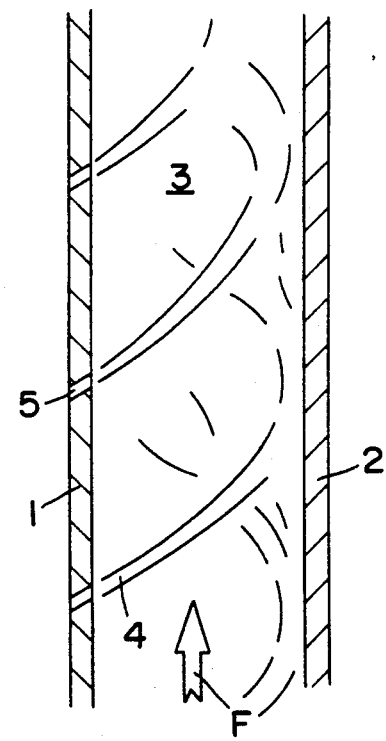
FIG. 4 shows one possible disposition of the electrode plates in sectional view and FIG. 5 shows an embodiment of the invention, applied to stationary reservoirs.

FIG. 4 of the electrode plates in a sectional view, taken along the main direction of the flow of the waste water, shows an alternative possibility of arranging the holes in accordance with the invention. In this embodiment only one of the plates is provided with holes 5. Further, the longitudinal axes of the holes are at an acute angle with the operative surface of the electrode plate in contrast to holes in the embodiment of the FIGS. 1–3, wherein the axes of the holes are at right angle with the surface of the plate. The longitudinal axis of the holes in FIG. 4 are inclined in the direction of the flow of the waste water (arrow F) in order to minimize the flow resistance. However, a sufficient mixing in the reaction area is achieved also with this arrangement. The angle in FIG. 4 is about 60°, but it can be varied depending on the flow velocity of the waste water and the distance between the plates 1 and 2.

Figure 5:
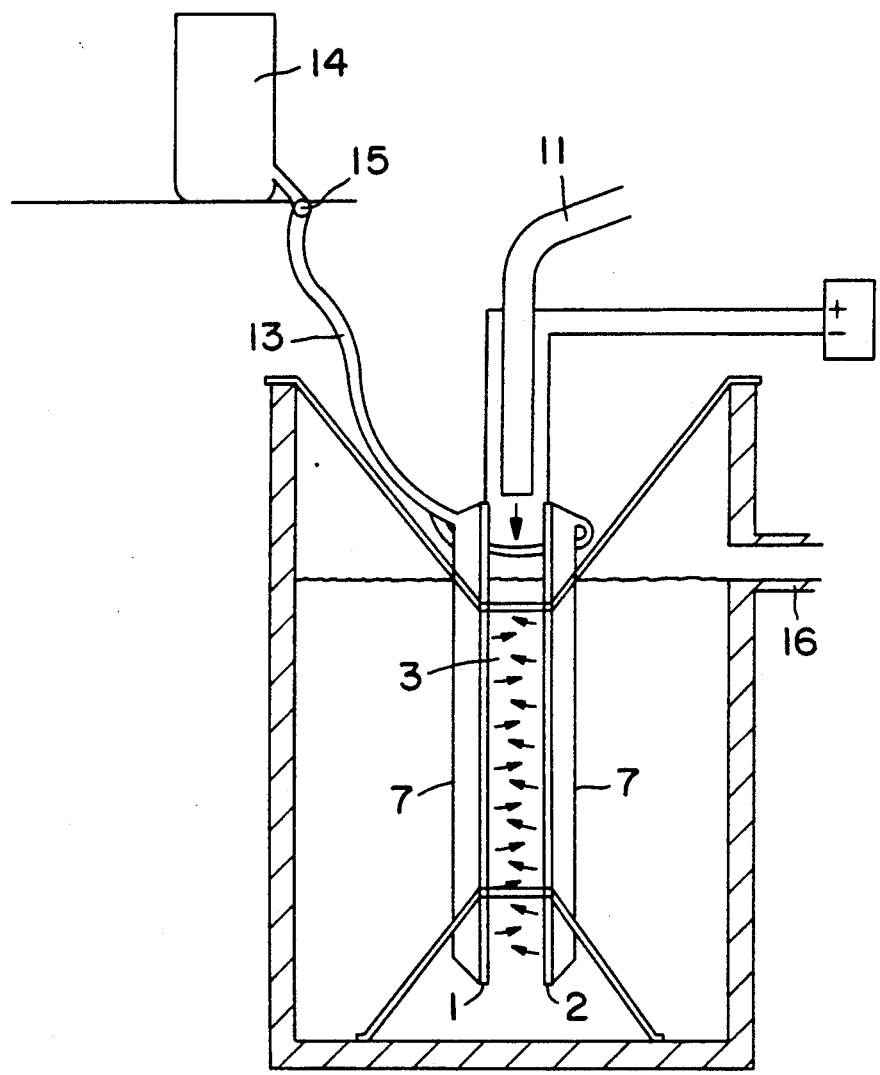

In FIG. 5, there is shown an embodiment of the invention, which can be applied to existing reservoirs of the waste waters, especially reservoirs of cyanidic wastes. The longitudinal electrode plates 1 and 2 are disposed vertically at the distance of 3–8 cm from each other. A cyanidic waste is supplied through the conduit 11 and it falls down in to the reservoir into the reaction area 3 between the plates 1 and 2. At the same time, a solution of NaCl is supplied from a tank 14 through conduits 13 in to intermediate containers 7 behind each electrode. These containers 7 can be, for example, formed of a plastic material, which is attached to the edges of the electrode plates 1 and 2. The medium flows into the reaction area through holes 5, which are disposed in the plates in manner similar to that shown by FIG. 3. The medium flows from the tank 14 to the containers 7 by gravity and the flow can be controlled with a valve 15. The incoming waste is decomposed rapidly between the electrode plates and the remaining cyanide is decomposed, as it spreads with the products of the electrolysis to other parts of the reservoir. A clear effluent is withdrawn through an overflow pipe 16.

The invention has further advantages as those described hereinabove. When introducing the medium behind the electrode plates into an intermediate container, the medium in contact with the back surface of the plate effectively cools the plate, which may become overheated during electrolysis. The gaseous bubbles created by electrolysis are well carried away with the flow of the waste water and the separation of the gases, liquids and solids can take place after the treated waste water has passed the apparatus of FIGS. 1 and 2. The waste water and the medium can be introduced by any suitable means to the apparatus, e.g. by means of pumps and/or gravitation. When the medium contains reactants taking part in the reactions in the reaction area 3, the flow of the medium can at the same time be used for controlling the rate of reactions within this area. This can be done by varying the volumetric flow of the medium and/or the concentration of the reactants therein. Even if the volumetric flow rate of the medium is varied during the process, the flow of the medium into the reaction area shows a good mixing effect. When the total volumetric flow of the medium in the apparatus having the configuration and the dimensions of that presented by FIGS. 1 and 2 is, for example, 100 liters/h, it can be deduced by a simple calculation, that the velocity of the medium as it is discharged through the holes is about 15 cm/s. The medium is thus discharged out of the holes in a jet having a cross section with a diameter of 2 mm at the outlet of the hole, and it becomes larger in cross section as it flows farther away from the plate and its velocity decreases. This jet causes at the same time good mixing of the material in the reaction area and flushes the opposite operational surface of the electrode plate. In order to improve the efficiency, it is advisable to dispose the plate so that each hole on each plate faces the area between the holes in the opposite plate in order to create a uniform distribution of the medium. At the volumetric flow rate of the waste water of 1000 l/h, the velocity of the flow along the reaction area 3 in the apparatus of FIGS. 1 and 2 is about 7.5 cm/s. It is advisable to keep the flow velocity of the waste water below that of the medium so that the mixing effect of the medium is sufficient. If in the apparatus of FIGS. 1 and 2 the total volumetric flow of the medium is more than 2.5% of that of the waste water, the above mentioned ratio can be maintained. The optimum range of this volumetric flow ratio is between 5 and 10%.

For the same reason, the distance D of the plates should be kept reasonably small to obtain the favourable results described above. As a rule, the distance should be in a range of 3 to 8 cm.

In order to prevent the flow of the waste water behind the electrode plates, the total area of the holes must be relatively small in order to obtain a sufficient pressure of the medium behind the electrode plate. The ratio of the total area of the holes to that of the electrode plate is 0.03% in the apparatus of FIGS. 1 and 2. In order to keep the volumetric flow rate of the medium at a reasonable level for obtaining a favourable flow of the medium, this percentage should not exceed 2%.

The invention is particularly suitable for introducing into the reaction area of reactants which take part in the oxidative electrolytic decomposition of cyanide. As described by various publications referred hereinabove, the chloride ions are conventionally added to the water before electrolysis. When the chloride ions are introduced separately from the waste water to the reaction area, a very high concentration of oxidative substances can be obtained in this area when using, for example, saturated NaCl-solution. In this way cyanide wastes having a relatively high cyanide content can be treated.

The invention can be varied in many ways depending on the desired effect. The disposition and the shape of the holes can be modified in order to obtain the optimum result. The medium, which is introduced into the reaction area can have various compositions. It can contain flocculation agents, agents for adjusting the pH etc. The medium can have also the same composition as the waste water to be treated, in which case it merely serves as a mixing and flushing agent. For the sake of easy handling, the medium is preferably liquid, but it can also contain gases dissolved therein and it can also be entirely gaseous or vaporous.

It is self-evident, that instrumentation and automation known to a man skilled in the art can be connected with the method and apparatus of the invention. Such instrumentation can include sensors monitoring the concentration of various substances and being connected to devices controlling the process parameters, such as volumetric flow of the waste water to be treated and the medium. The electric connections to the electrodes are also widely known in the art of electrolysis and they are therefore illustrated only schematically in the Figures.

The electrodes can be made of any suitable electrode material, depending on the process. Such materials are e.g. iron, stainless steel, nickel-plated steel, platinum-plated titanium, soluble anodes used in flocculation processes, etc.

The platelike electrodes can have also other shapes than a planar straight one. The electrodes can e.g. be curved. One alternative is to dispose two electrodes having a cylindrical shape coaxially, one inside the other. In this case the annular space between the two electrodes forms the reaction area and the medium can be introduced via the circular space within the inner electrode and through the holes in this electrode.

Although the main interest of the invention is in applying it to treatment of waste waters, which often contain impurities making the electrolytic treatment difficult, it can be also used for electrolytic treatment of other liquids, where the main purpose is to produce substances electrolytically, e.g. in processes of manufacturing sodium chlorate from the solution of sodium chloride.

A following example illustrates an experiment conducted with an apparatus of FIGS. 1 and 2.

EXAMPLE

Waste water from a zinc plating bath containing 6.7 g/l of cyanide was passed through two apparatuses assembled in series and having dimensions of that in FIGS. 1 and 2. The volumetric flow of the waste was 1000 liters/h. A medium of 2.8% NaCl solution was introduced to the intermediate containers in both apparatuses as a continuous flow, the total flow being 150 liters/h. The current and voltage used was 150 A/4 v. In the effluent discharged from the outlet end of the assembly, the separation to a clear supernatant and a precipitate containing zinc took place. The cyanide content in the supernatant was 1.8 g/liter. In this experiment, electrodes made from iron plate were used.

I claim:

1. Apparatus for electrolytically treating a liquid which contains reactants, said apparatus comprising:

two plate-like electrodes having opposite charges and operative surfaces which are opposed to each other to form a reaction area therebetween for said liquid passing between said electrodes;

means for passing said liquid into said reaction area; and, means for introducing a medium into said reaction area separately from said liquid and in a flow direction different from the flow of liquid across said operative surfaces of said electrodes, said means comprising through holes perforated in at least one of said plate-like electrodes for passing medium from behind at least one of said electrodes into said reaction area, said holes being sufficiently large to provide a jet-like flow of medium into said liquid for causing turbulence in said liquid, the ratio of total area of said holes to the area of the operative surfaces of said at least one electrode being less than about 2%.

* * * * *